(12) United States Patent
Buettner

(10) Patent No.: US 7,285,724 B2
(45) Date of Patent: Oct. 23, 2007

(54) BUS BAR CARRIER

(75) Inventor: Alex Buettner, Roedental (DE)

(73) Assignee: Wohner GmbH & Co. KG, Rodental (DE)

(*) Notice: Subject to any disclaimer, the term of this patent is extended or adjusted under 35 U.S.C. 154(b) by 0 days.

(21) Appl. No.: 11/189,871

(22) Filed: Jul. 27, 2005

(65) Prior Publication Data

US 2006/0240694 A1    Oct. 26, 2006

(30) Foreign Application Priority Data

Apr. 21, 2005   (DE) ................. 10 2005 018 571

(51) Int. Cl.
*H02G 5/00* (2006.01)

(52) U.S. Cl. ............... 174/70 B; 174/68.2; 174/72 B; 174/99 B; 361/811; 439/212

(58) Field of Classification Search ............ 174/68.2, 174/70 B, 71 B, 72 B, 88 B, 99 B, 129 B, 174/133 B, 149 B; 361/611, 614, 615, 624, 361/637, 638, 639, 648, 649, 650, 801, 825; 439/114, 115, 119, 212, 213

See application file for complete search history.

(56) References Cited

U.S. PATENT DOCUMENTS 3,044,036 A * 7/1962 Herrmann ................ 174/99 B
3,113,820 A * 12/1963 Norden ..................... 439/114
4,242,718 A    12/1980 Shariff et al.
5,213,518 A * 5/1993 Weidler .................... 439/212
5,847,321 A * 12/1998 Carle et al. ............... 174/99 B
6,549,428 B1 * 4/2003 Fontana et al. ........... 174/71 B
6,664,478 B2 * 12/2003 Mohan et al. ........... 174/149 B

FOREIGN PATENT DOCUMENTS

DE    30 04 899 C2    8/1980
DE    31 43 518 A1    5/1983
GB    2 112 586 A     7/1983

* cited by examiner

*Primary Examiner*—Dhiru R. Patel
(74) *Attorney, Agent, or Firm*—Sughrue Mion, PLLC

(57) ABSTRACT

The invention relates to a plastic bus bar carrier having a lower part, an upper part and an adaptor arranged between the lower part and the upper part for the adaptation to different sizes of bus bars. The lower part includes a number of receiving grooves in correspondence with the number of bus bars to be received, wherein the receiving grooves have a width defined vertically to the longitudinal axis of the bus bar carrier which is smaller than the maximum transverse dimension of the lower part.

17 Claims, 6 Drawing Sheets

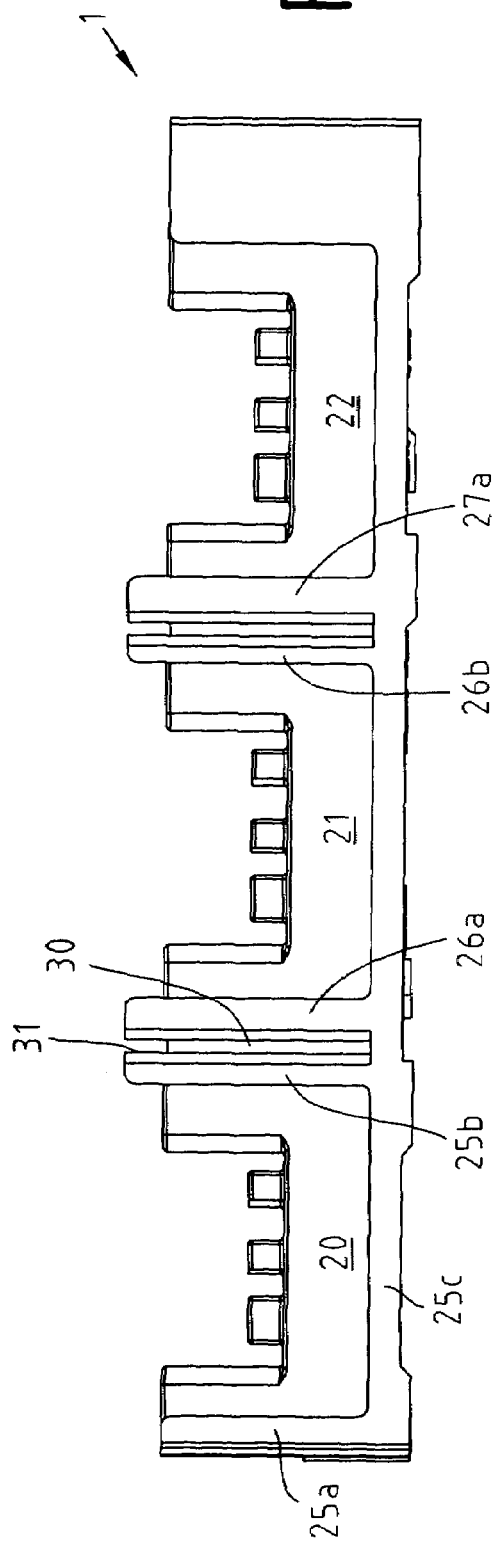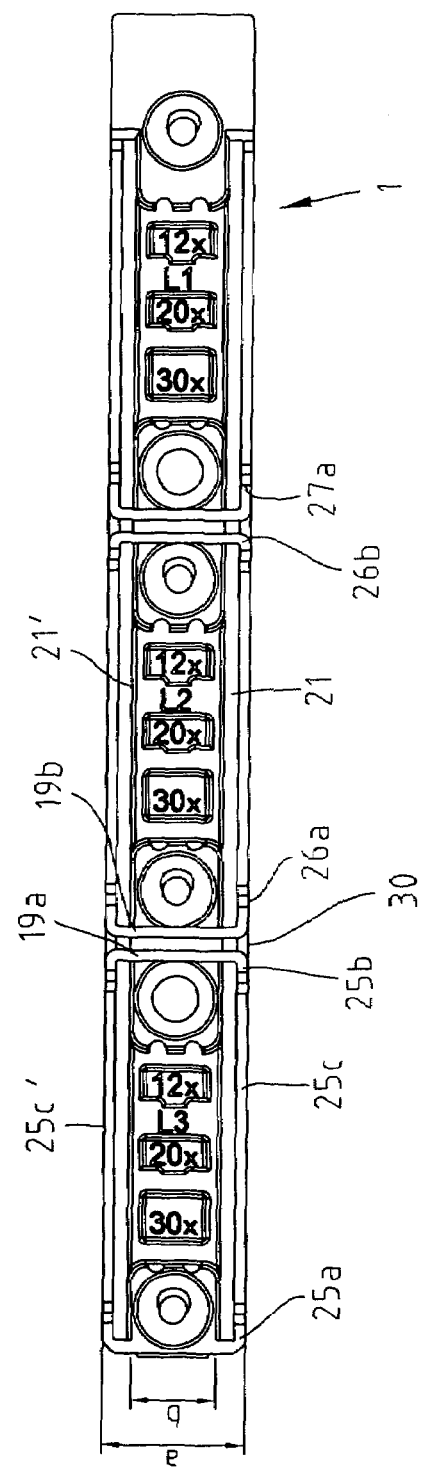

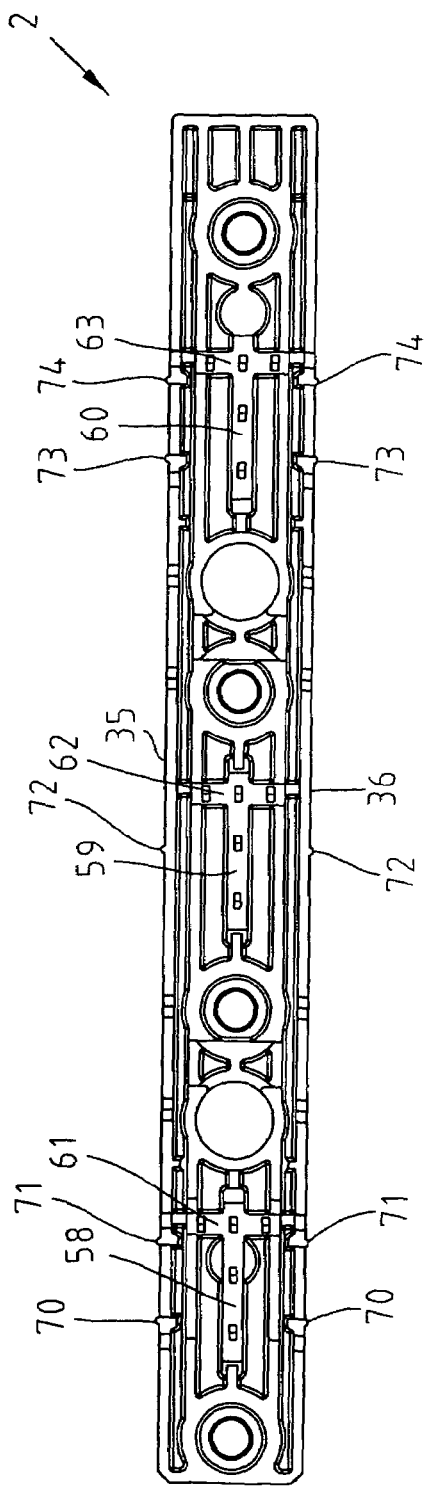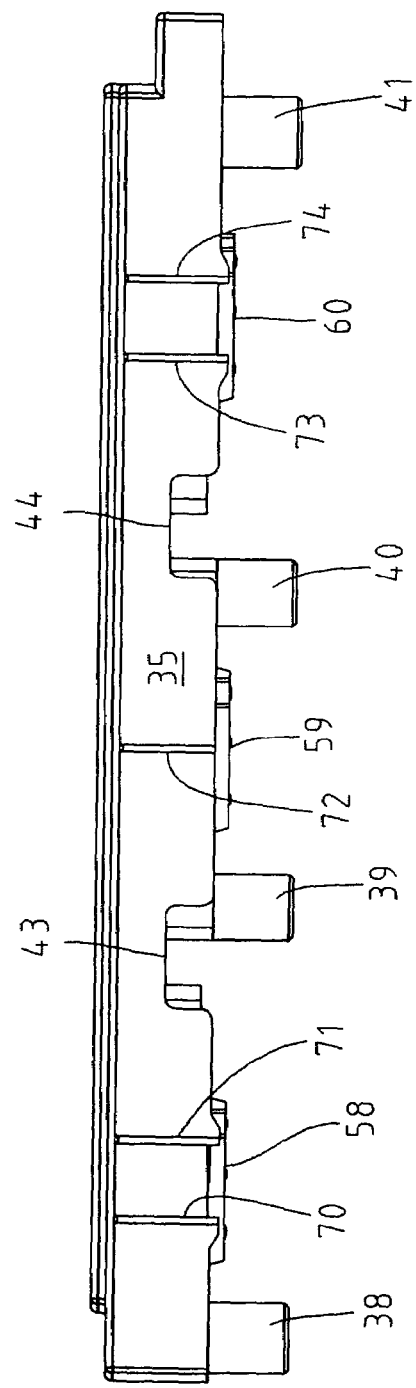

BUS BAR CARRIER

The invention relates to a plastic bus bar carrier having a lower part, an upper part and an adaptor arranged between the lower part and the upper part for the adaptation to different sizes of bus bars, wherein the lower part comprises a number of receiving grooves in correspondence with the number of bus bars to be received.

A bus bar carrier made of plastic is known from DE 33 21 441 A1, which is formed of a lower part and an upper part, between which an adaptor is arranged to be adjustable, which serves to adapt the bus bar carrier to different bus bar widths.

The invention is based on the object to improve a bus bar carrier of the aforementioned type such that the theoretically possibly paths for leak currents along the bus bar carrier between adjacent bus bars are extended such that leak currents can practically not occur.

According to the invention this object is achieved by a plastic bus bar carrier having a lower part, an upper part and an adaptor arranged between the lower part and the upper part for the adaptation to different sizes of bus bars, wherein the lower part comprises a number of receiving grooves in correspondence with the number of bus bars to be received, wherein the receiving grooves have a width defined vertically to the longitudinal axis of the bus bar carrier which is smaller than the maximum transverse dimension of the lower part.

Bus bar carriers may be configured unipolar or multipolar, wherein the multipolar configurations of bus bar carriers serve the accommodation of several bus bars. The current-carrying bus bars preferably have the form of flat bars and, depending on the intensity of the current, differ in width and thickness. An adaptor serves the correct positioning of the bus bars, which is preferably provided as an integral element and can be adjusted for the adaptation to the size of the used bus bars. The upper part and the lower part of the bus bar carrier are thereby designed to have equal sizes, namely with respect to the length in the longitudinal axis and with respect to the width in the transverse direction to the longitudinal axis.

The bus bar carrier according to the invention was developed to correspond to the UL standard, wherein the distances between current-carrying bus bars were, according to the invention, enlarged such that the distances of the bus bars toward each other amount to approximately 2.5 cm (1 inch) air gap and approximately 5.08 cm (2 inches) leakage path between adjacent bus bars. Thus, the bus bar carrier according to the invention is characterized by that, with a bus bar distance of 60 mm and a maximum width of the bus bars of 30 mm, it has a theoretical minimum leakage path of 5.08 cm (2 inches). The distance between the bus bars is enlarged to approximately or at least 5.08 cm. By this, however, the external geometry with respect to bus bar carriers according to the IEC standard is not changed.

The bus bar carrier according to the invention is characterized by that a total path of at least 2 inches or, respectively, 5.08 cm is obtained due to cavities or recesses, respectively, and due to ribbings or projecting legs, respectively, between the adjacent bus bars, more precisely between the grooves receiving the bus bars.

According to a preferred embodiment the extension of the theoretical leakage path is obtained by that the lower part has a transverse dimension in the area of the receiving grooves for the bus bars which is smaller than the maximum width of the lower part in the area of the transitional section toward the next receiving groove, i.e. that projecting legs or the like are provided approximately in the center between the adjacent receiving grooves.

According to a preferred embodiment the upper part of the bus bar carrier is formed such that an air gap extends between the upper part and the lower part in the transitional area between adjacent receiving grooves, so that also in the transitional area the generation of leak currents is avoided.

According to another embodiment of the bus bar carrier the upper part is formed such that partial centers of pressure of the upper part lie on the bus bars and thus ensure a theoretical minimum leakage path.

According to another embodiment of the bus bar carrier the adaptor is formed by one adaptor element per receiving groove, so that the adaptor elements may be offset individually or, respectively, adapted to the width of the bar. The adaptor elements are preferably configured as plug-in elements and may be adapted to different thicknesses of bus bars, e.g. 5 mm or 10 mm, by rotating them about 180°. On the other hand, the bus bar carrier according to the invention also allows the use of different adaptor elements to be adjusted to different widths and heights of the bars. With the adaptor elements, the adjustment to a predefined bus bar height inside the bus bar carrier is allowed by that the adaptor elements are preferably formed of two webs parallel to each other, which are connected by two transverse webs, with the transverse webs being provided either in the center of the longitudinal webs or are aligned with an edge of the longitudinal webs.

The bus bar carrier according to the invention will be described below with reference to the drawing in order to explain further features. In the drawing:

FIG. 2 shows a side view of the lower part;

FIG. 3 shows a top view onto the lower part;

FIG. 4 shows a view of the upper part from below;

FIG. 5 shows a side view of the upper part of the bus bar carrier;

Figure 1:
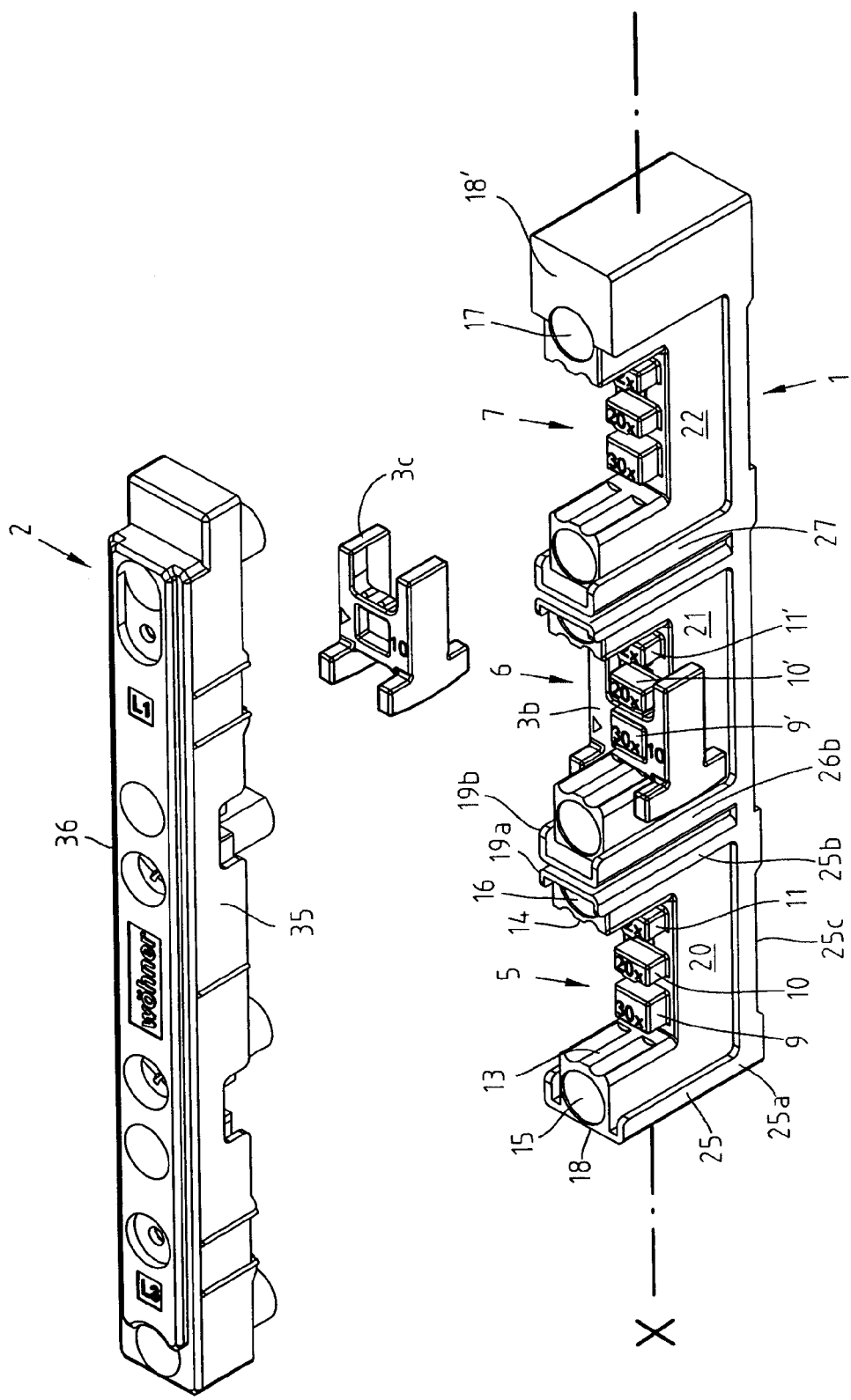
FIG. 1 shows a perspective view of a bus bar carrier according to the invention in a disassembled representation.

A preferred embodiment of the bus bar carrier according to the invention will be described below. FIG. 1 shows a perspective, disassembled representation of the bus bar carrier formed of a lower part 1 and an upper part 2, which are joined by including an adaptor. With a bus bar carrier of the type shown in FIG. 1, which is formed to have three poles, the adaptor consists of individual adaptor elements 3a, 3b, 3c, whereof only adaptor elements 3b and 3c are illustrated in FIG. 1.

FIGS. 2 to 4 correspondingly show a side view of the lower part 1, a top view onto the lower part 1 and a view of the upper part 2.

FIG. 5 shows a side view of the upper part 2 in correspondence with FIG. 4 and FIG. 1.

The lower part 1 comprises groove-shaped recesses hereinafter designated with receiving grooves 5, 6, 7, i.e. three receiving grooves for a three-pole bus bar carrier. The receiving grooves 5, 6, 7 serve to receive the bus bars still to be described. Each receiving groove 5, 6, 7 comprises locking teeth 9, 10, 11 which project upwardly from the lower part 1 and serve to fix one adaptor element respectively. The locking teeth designated with 9' and 10' in FIG. 1 fix the adaptor element designated with 3b on the lower part 1, the function of which will be described below. By the plurality of the locking teeth 9, 10, 11 and 9', 10' 11', respectively, it is thus possible to insert the adaptor element 3b and 3c, respectively, displaced in the longitudinal direction, at different positions of the lower part, depending on the width or thickness of the pertinent bus bars.

Walls 13, 14 vertically extending inside the receiving grooves 5, 6, 7 define the width of the receiving grooves 5, 6, 7, wherein the walls 13, 14 are directed toward the respective receiving groove 5 and constitute a limiting wall with respect to a largely cylindrical receptacle 15, 16 which serves to receive screwing means. Correspondingly, also the receiving grooves 6, 7 are limited by such walls.

Wall 13, being opposite relative to the cylindrical receptacle 15, is an outer wall 18 which limits the receiving groove 5 outwardly. Opposite to wall 14, being on the outside relative to the cylindrical receptacle 16, a wall 19 is provided, which limits the receiving groove 5 with respect to the receiving groove 6. The outer dimension of the receiving groove 5 and, correspondingly, also of the receiving groove 6, 7, is limited by corresponding walls, while the clear width of the receiving grooves 5, 6, 7 is defined by the walls corresponding to walls 13, 14.

Each receiving groove 5, 6, 7 is defined by approximately U-shaped outer surfaces 20, 21, 22 (FIG. 2) formed mirror-symmetrically with respect to the longitudinal axis of the bus bar carrier. These surfaces 20, 21, 22 are defined on both sides of the bus bar carrier by ribs or projections 25, 26, 27 substantially extending in a U-shaped manner, with the ribs 25, 26, 27 being outwardly advanced on the sides with respect to surfaces 20, 21, 22. Each rib 25 is formed of two vertical sections 25a, 25b and one horizontally extending section 25c (FIG. 1). The same refers to ribs 26, 27. As can clearly be seen in FIG. 3, the sections 25a, 25b and 25c extend parallel and observe a predefined distance with respect to the surfaces 20, 21, 22. According to a preferred embodiment, an at least laterally or, respectively, vertically extending groove or undercut 30, which defines a gap 31 between the walls 19a, 19b (FIG. 2) on the upper side of the lower part 1, is provided between the wall 19a of the receiving groove 5 and the adjacent wall designated with 19b of the receiving groove 6.

It can be inferred from the above description that the distance of surfaces 20 parallel to each other is smaller than the distance between ribs 25a, 25a' and 25c, 25c', respectively, parallel to each other, i.e., between the rib sections 25a, 25b, 25c on the one side of the lower part 1 and the corresponding rib sections 25a', 25b', 25c' on the other side of the lower part 1, the dimension of the lower part 1 transversely to the longitudinal axis is larger than the distance between the parallel surfaces 20 and 21, respectively, and 22, respectively, belonging to each other. This means, in other words, that the ribs parallel to each other (FIG. 3) define a transverse dimension a, while the surfaces 20 and 20', respectively, or 21 and 21', respectively, (FIG. 3) define a transverse dimension b smaller with respect to a.

As can likewise be inferred from FIG. 1 and FIG. 3, the locking teeth have a width, again, being smaller than the transverse dimension b. The purpose of these different transverse dimensions of the lower part 1 in connection with the ribs 25, 26, 27 laterally projecting over the surfaces 20, 21, 22 resides in making theoretical leakage paths between the bus bars inserted in the individual receiving grooves 5, 6, 7 as large as possible so as to practically preclude leak currents along these leakage paths. It can be seen from the above description that, without rib sections 25, 26 and without the undercut 30, the path for a theoretically existing leak current from a bus bar in the receiving groove 5 to a bus bar in the receiving groove 6 would be substantially shorter than it would be in the above-described construction.

With the construction as described, the same also refers to the bus bars inside the receiving grooves 6 and 7.

Due to the substantially U-shaped ribs 25, 26, 27 provided on the sides of surfaces 20, 21, 22 and extending outwardly offset with respect to the surfaces 20, 21, 22 on the sides, however, the path between adjacent receiving grooves is considerably extended. Thus, the formation of leak currents between adjacent current-carrying bus bars is suppressed. It be explicitly pointed out that the lower part 1, as well as the upper part 2, on the opposite side not shown in FIG. 1 is substantially designed in the same manner inferable from the top view shown in FIG. 3 with respect to the lower part 1 and with respect to the upper part 2.

The locking teeth 9, 10, 11 and 9', 10', 11', respectively, preferably have—seen in the axial direction of the lower part 1—a different width. Moreover, these locking teeth may be provided with corresponding designations such as "12x", "20x", "30x" (see FIG. 3), by which the person inserting the bus bar carrier learns about an allocation for inserting the individual adaptor elements with respect to the respective width of the bars. The height of the locking teeth 9, 10, 11 and 9', 10', 11', respectively, perpendicular to the longitudinal axis is preferably the same, however.

According to another preferred embodiment the cylindrical receptacle 17 on the outside is, towards the outside, enclosed by an approximately four-square or square block 18'. In case of need, however, a construction as described in view of wall 18 may be selected instead.

The upper part 2 is formed of a basic element substantially U-shaped in section, with side walls 35, 36 extending parallel to each other and having a distance towards each other which corresponds to the distance of ribs 25 parallel to each other of lower part 1. This means that, if the bus bar carrier of the upper part 2 is mounted, the side walls 35, 36 are aligned with respect to the respective ribs 25, 26, 27 of the lower part 1. Cylindrical receptacles 38 to 41 are located between the side walls 35, 36, the outer diameter of which is smaller than the inner diameter of the cylindrical receptacles 15, 16 of the respective receiving grooves 5, 6, 7, so that the cylindrical receptacles 38, 39, 40, 41 can be pushed into the corresponding receptacles 15, 16. The receptacles 15, 16 of the lower part and the receptacles 38, 39, 40, 41 of the upper part 2 serve the guidance of fastening screws, on the one hand, and ensure a snug fit between the lower part 1 and the upper part 2, on the other hand.

Figure 6:
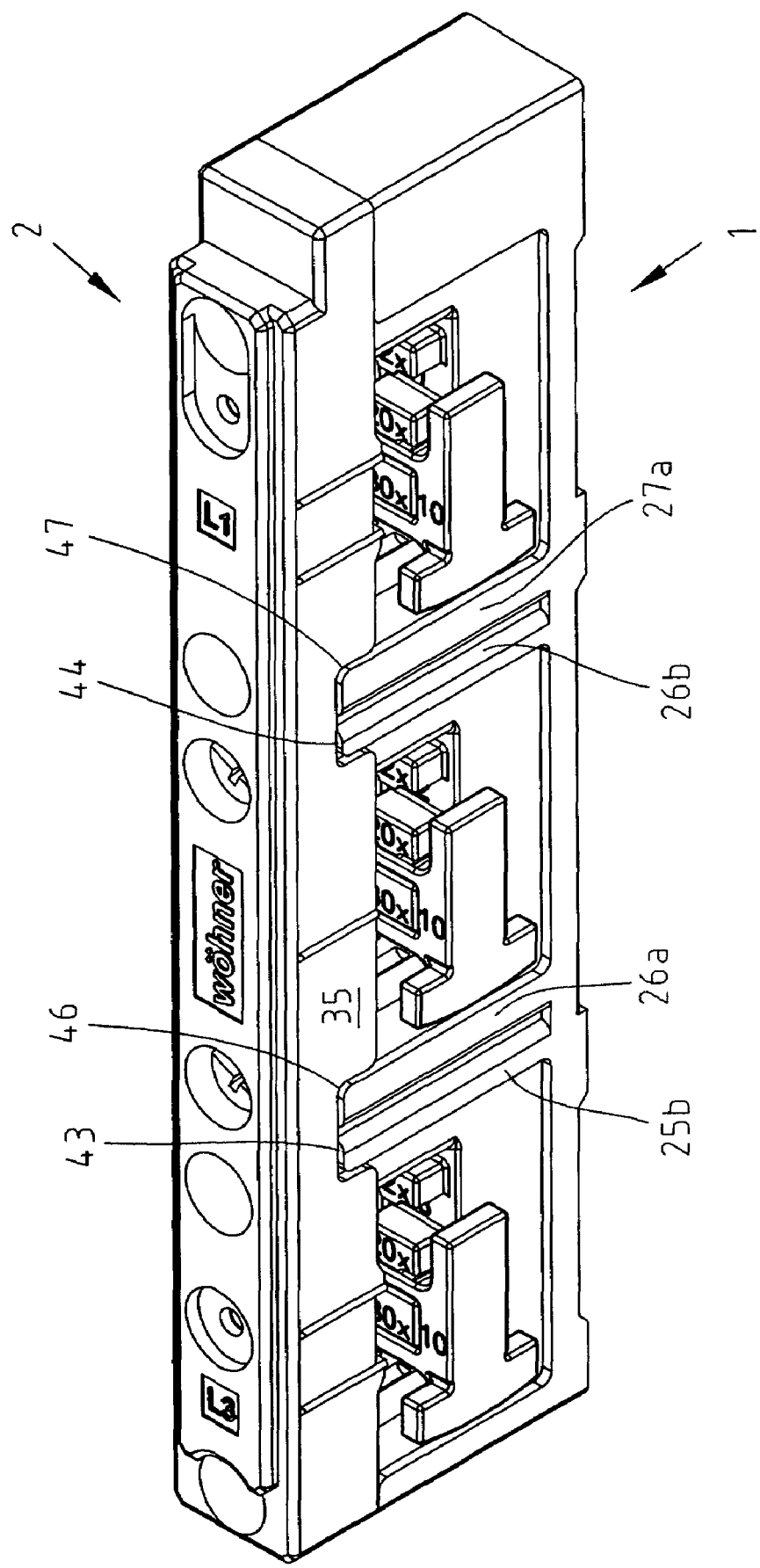
FIG. 6 shows a perspective view of a preferred embodiment of the bus bar carrier with adaptor elements installed therein.

In both walls 35, 36, cutouts 43, 44 are provided at predetermined positions. In the embodiment as described, these cutouts 43, 44 are provided on a position, on which the vertical legs 25b, 26a and 26b and 27a, respectively, of the ribs 25, 26, 27 lead vertically from the lower part 1 in an upward direction. As can be seen from FIG. 6, an air gap is thus defined between the edges of the lateral surfaces 35 and 36 defined by the cutouts 43, 44 with respect to the upper edge of sections 25b, 26a and 26b, 27a, respectively, so that a direct contact between the upper part 2 and the lower part 1 is precluded in this area. Thus, it is prevented that a leak current path, for example, between surface 20 and surface 21, is generated directly via the side wall 35, by by-passing sections 25b, 26a. These air gaps extending in an approximately U-shaped manner are shown by the reference numerals 46, 47 in FIG. 6 and are defined by the contour of the cutouts 43, 44 (also see FIG. 7).

Figure 7:
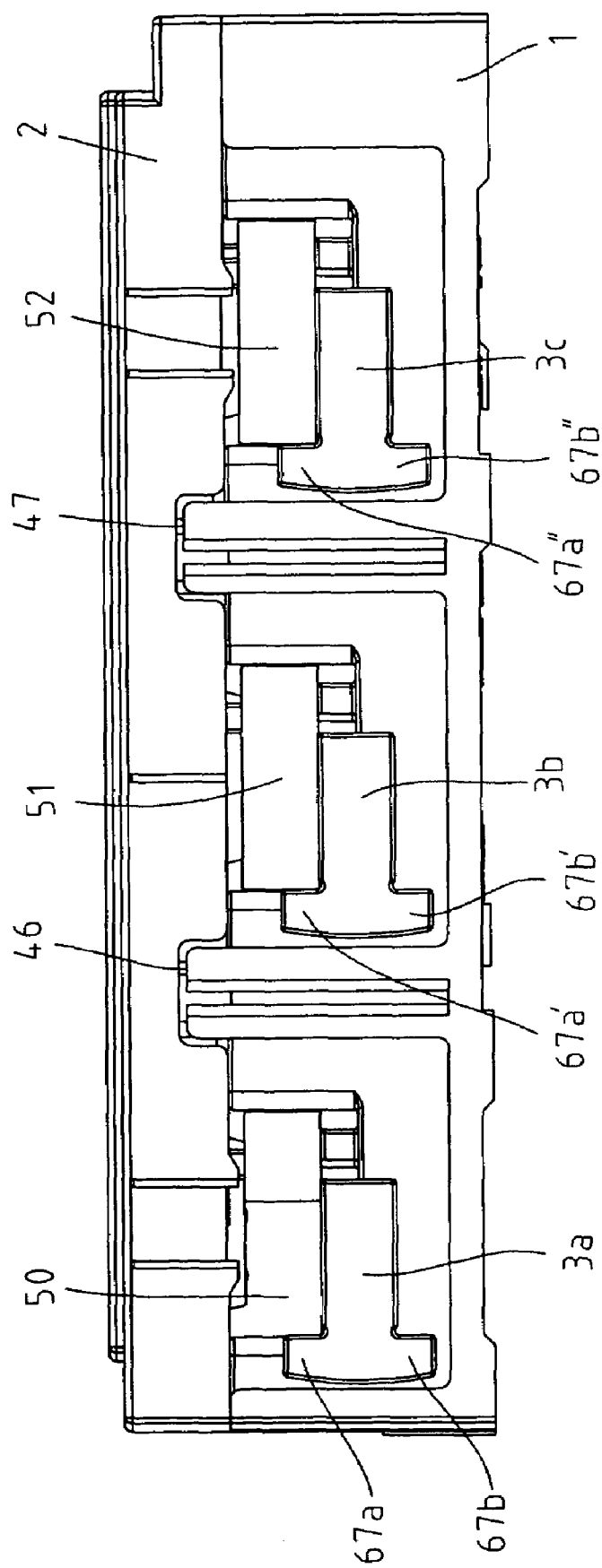
FIG. 7 shows a side view of the bus bar carrier shown in FIG. 6 together with the respective bus bars.

FIG. 7 represents a bus bar carrier in an assembled state, comprising the lower part 1 and the upper part 2 which directly lie on each other on the outer end sections and which receive bus bars designated with 50, 51, 52. Moreover, FIG. 7 represents the use of the adaptor in the form of individual adaptor elements 3a, 3b, 3c which, in the position shown in FIG. 7, are adjusted to the largest bar width, i.e. which—in the longitudinal axis X—vacate the entire width of the receiving groove with their limiting noses 54, 55, 56, as the limiting noses are laterally placed outside the respective receiving grooves 5, 6, 7, i.e. they come to lie laterally of the cylindrical receptacle 15 with respect to the receiving groove 5. The same also refers to the receiving grooves 6, 7.

The limiting noses designated with 67a, 67b, 68a, 68b correspond to those generally designated with 67a, 67b, 67a', 67b', 67a'', 67b'' in FIG. 7 and, in connection with the longitudinal webs 62, 63, result in a T-shaped configuration when viewed from the side.

In the represented embodiment, the use of one type of an adaptor element only is achieved in that the transverse webs 64, 65 are arranged to be offset with respect to the center plane of the longitudinal webs 62, 63 so that, in view of the longitudinal axis of each adaptor element, there is no more mirror symmetry.

To ensure a safe clamping of the bus bars between the lower part 1 and the upper part 2, the upper part 2 is provided with webs 58, 59, 60 projecting downwardly which, in the direction of the longitudinal axis of the upper part 2, extend over a distance being smaller than the width of the groove in the direction of the longitudinal axis, and which lie on the corresponding bus bar when the upper part 2 is firmly screwed onto the lower part. Each web 58, 59, 60 may be provided with a short transverse web 61, 62, 63 which observes the distance to the side walls 35, 36. The webs 58, 59, 60 are spaced away with respect to adjacent ribs, cylindrical receptacles such as receptacles 38, 39, 40, 41 etc. extending in the upper part 2, as can, for example, be seen in FIG. 4, so as to suppress short paths for leak currents. The webs 58, 59, 60 are shown in FIG. 5 and, in the embodiment as described, slightly project over the lower edge of the side walls 35, 36.

Figure 9:
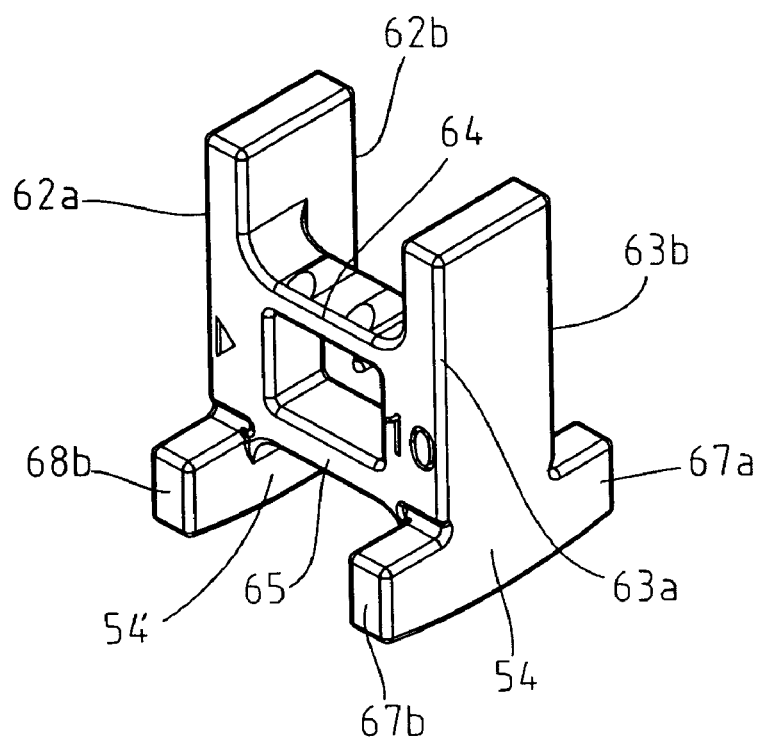
FIG. 9 shows the adaptor element shown in FIG. 8, as compared to FIG. 8 rotated by 180°, to be used for bus bars having a thickness of 10 mm.
Figure 8:
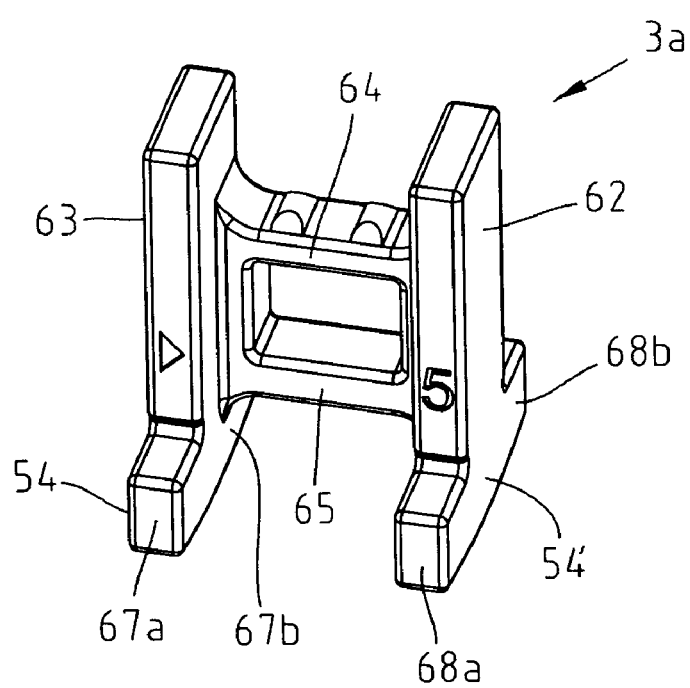
FIG. 8 shows a perspective view of an adaptor element to be used for bus bars having a thickness of 5 mm.

With reference to FIGS. 8 and 9 details of the adaptor elements 3a, 3b, 3c are described. For different bus bar widths either different or the same adaptor elements may be used. In the preferred embodiment as described, the same adaptor elements are used for both bus bars having a thickness of, for example, 5 mm and bus bars having a thickness of, for example, 10 mm, which guarantee, however, due to their construction, that the bus bars in both cases can be inserted inside the bus bar carrier on the same height.

FIG. 8 shows an adaptor element, e.g. the adaptor element 3a, which is formed of two longitudinal webs 62, 63 being parallel to each other, which are connected to each other by means of transverse webs 64, 65. Limiting noses 67a, 68a and 67b, 68b are provided on one end of the longitudinal webs 62, 63, which project over the longitudinal webs 62, 63 towards both sides in an approximately vertical manner. According to the preferred embodiment of the adaptor elements as described, the transverse webs 64, 65 are aligned with one edge 62a, 63a of the longitudinal webs 62, 63 and observe a distance toward the opposite edge 62b, 63b of the corresponding longitudinal webs. This means that the transverse webs 64, 65 are offset with respect to an imagined center plane of the longitudinal webs 62, 63. On the one side (FIG. 8) the longitudinal webs include a designation, for example, "5", which is to indicate that the corresponding surface of the adaptor element is to be inserted in the receiving groove with this surface facing upwardly if the bar thickness is 5 mm. By rotating the adaptor element 3a in accordance with FIG. 8 by 180° the transverse webs 64, 65 are aligned with the surface of the adaptor element 3a facing upwardly, as a result of which - due to the arrangement of the transverse webs 64, 65 in the above-described manner—the adaptor element 3a can be inserted in the locking teeth or the receiving groove, respectively, more deeply as compared to the case where the adaptor element shown in FIG. 8 is pushed into the locking teeth with the designation "5" facing upwardly. In the latter case, the bus bar element lying on the longitudinal webs 62, 63 is mounted in the receiving groove on a lower level as compared to the use of the adaptor element in the position according to FIG. 9. In both cases, the bus bars adopt the same upper level with their upper surface.

With an adaptor element of the type as shown in FIG. 8, thus a bus bar having a thickness of 5 mm as well as a bus bar having a thickness of 10 mm can be inserted with one single construction of the adaptor element, so that both the production and the use of different adaptor elements can be avoided.

Below, another preferred embodiment of a bus bar carrier will be described with reference to FIGS. 4 and 5. With this bus bar carrier, the upper part 2 is provided with outwardly projecting ribs 70, 71, 72, 73, 74 or 70', 71', 72', 73', 74', respectively, on its outer walls 35, 36. The number of these outwardly projecting and substantially vertically extending ribs 70 to 74' depends on the case of need and, for example, also on the length of the bus bar carrier. These ribs, which outwardly project over the walls 35, 36, serve to prevent a laminar contact with respect to adjacent devices, i.e. to observe a predetermined distance to adjacent devices, bus bar carriers and the like so as to thereby eliminate possible leakage paths.

In the embodiment as illustrated, the ribs 70, 71 etc. are preferably arranged approximately in the center between the cylindrical receptacles 38, 39 etc. The thickness and the height of the ribs 70, 71 etc. is selected such that leak currents can reliably be prevented and, respectively, that a laminar contact with respect to adjacent devices or the like is reliably avoided.

The invention claimed is:

1. A bus bar carrier having a lower part, an upper part and an adaptor, comprising at least one adaptor element, arranged between the lower part and the upper part for adaptation to different sizes of bus bars, wherein the lower part comprises a number of receiving grooves in correspondence with a number of bus bars to be received, wherein the receiving groove; have a width defined vertically to a longitudinal axis of the bus bar carrier which is smaller than a maximum transverse dimension of the lower part, wherein further the receiving grooves are defined by outer surfaces of the lower part and said lower part is provided with ribs extending parallel to the longitudinal axis of the lower part, said ribs being arranged on the outer surfaces of the lower part in an outwardly offset manner, such that they surround the receiving grooves in an approximately U-shaped manner, and wherein said ribs are provided outwardly offset with respect to the outer surfaces by defining a gap therebetween, and said ribs are extending from said outer surfaces in a U-shaped manner, thereby increasing the path of leakage current.

2. A bus bar carrier according to claim 1, wherein said receiving grooves are limited by cylindrical receptacles.

3. A bus bar carrier according to claim 1, wherein each receiving groove is placed inside a section defined by a vertical wall.

4. A bus bar carrier according to claim 1, wherein each receiving groove is placed inside a section defined by a vertical wall, and wherein
between said vertical walls grooves or undercuts, respectively, are formed.

5. A bus bar carrier according to claim 1, wherein each receiving groove is placed inside a section defined by a vertical wall,
between said vertical walls grooves or undercuts, respectively, are formed, and
the lower part has an outer dimension in the area of said vertical grooves or undercuts, respectively, which corresponds approximately to the outer dimension in the area of the surfaces of the lower part.

6. A bus bar carrier according to claim 1, wherein said upper part comprises side walls the distance of which transversely to the longitudinal axis corresponds approximately to the distance between a pair of said ribs transversely to the longitudinal direction of the lower part.

7. A bus bar carrier according to claim 1, wherein said upper part comprises side walls the distance of which transversely to the longitudinal axis corresponds approximately to the distance between a pair of said ribs transversely to the longitudinal direction of the lower part, and
the side walls of the upper part have cutouts at least in those areas which are above and laterally of vertical sections of the ribs.

8. A bus bar carrier according to claim 1, wherein said upper part comprises side walls the distance of which transversely to the longitudinal axis corresponds approximately to the distance between a pair of said ribs transversely to the longitudinal direction of the lower part,
the side walls of the upper part have cutouts at least in those areas which are above and laterally of vertical sections of the ribs, and
the cutouts define a predetermined air gap between the upper part and the lower part.

9. A bus bar carrier according to claim 1, wherein each of said receiving grooves comprises upwardly projecting locking teeth.

10. A bus bar carrier according to claim 1, wherein each of said receiving grooves comprises upwardly projecting locking teeth for receiving an adaptor element being provided to support bus bars of different width.

11. A bus bar carrier according to claim 1, wherein each of said receiving grooves comprises upwardly projecting locking teeth for receiving an adaptor element that is provided to support bus bars of different width, and
each said adaptor element is formed of two longitudinal webs extending parallel to each other, which are connected to each other by means of transverse webs.

12. A bus bar carrier according to claim 1, wherein each of said receiving grooves comprises upwardly projecting locking teeth for receiving an adaptor element that is provided to support bus bars of different width,
each said adaptor element is formed of two longitudinal webs extending parallel to each other, which are connected to each other by means of transverse webs, and
each said adaptor element is provided with double-sided projecting limiting noses on one end of the longitudinal webs.

13. A bus bar carrier according to claim 1, wherein the carrier is made of plastic.

14. A bus bar carrier having a lower part, an upper part and an adaptor, comprising at least one adaptor element, arranged between the lower part and the upper part for adaptation to different sizes of bus bars, wherein the lower part comprises a number of receiving grooves in correspondence with a number of bus bars to be received, wherein
the receiving grooves have a width defined vertically to a longitudinal axis of the bus bar carrier which is smaller than the maximum transverse dimension of the lower part, wherein further
the receiving grooves are defined by outer surfaces of the lower part and said lower part is provided with ribs extending parallel to the longitudinal axis of the lower part, said ribs being arranged on the outer surfaces of the lower part in an outwardly offset manner, such that they surround the receiving grooves in an approximately U-shaped manner, wherein
said ribs are provided outwardly offset with respect to the outer surfaces by defining a gap therebetween,
such that said ribs are extending from said outer surfaces in U-shaped manner, thereby increasing the path of leakage current,
each receiving groove is placed inside a section defined by a vertical wall,
between said vertical walls grooves or undercuts, respectively, are formed, and
the lower part has an outer dimension in the area of said vertical grooves or undercuts, respectively, which corresponds approximately to the outer dimension in the area of the surfaces of the lower part.

15. A bus bar carrier according to claim 14, wherein each receiving groove comprises upwardly projecting locking teeth for receiving an adaptor element that is provided to support bus bars of different width.

16. A bus bar carrier according to claim 14, wherein each of said receiving grooves comprises upwardly projecting locking teeth for receiving an adaptor element, said an adaptor element being provided to support bus bars of different width, each adaptor element being formed of two longitudinal webs extending parallel to each other, which are connected to each other by means of transverse webs, and
the transverse webs define at least one opening the clear cross-section of which corresponds approximately to the cross-section of one of the locking teeth.

17. A bus bar carrier according to claim 14, wherein the carrier is made of plastic.

* * * * *